United States Patent [19]

Copeland

[11] Patent Number: 4,500,980
[45] Date of Patent: Feb. 19, 1985

[54] SEISMIC STREAMER CONNECTOR ASSEMBLY

[75] Inventor: James R. Copeland, Irving, Tex.

[73] Assignee: Whitehall Corporation, Dallas, Tex.

[21] Appl. No.: 295,499

[22] Filed: Aug. 24, 1981

[51] Int. Cl.³ .......................... G01V 1/00; H04B 13/00
[52] U.S. Cl. ...................................... 367/154; 367/20;
    339/49 R; 339/47 R
[58] Field of Search ..................... 367/19, 15, 18, 154,
    367/20, 177, 153; 339/47 R, 49 R

[56] References Cited

U.S. PATENT DOCUMENTS

3,812,455  5/1974  Pearson ............................. 339/49 R
4,204,188  5/1980  Weichart et al. .................. 367/154

Primary Examiner—Nelson Moskowitz
Assistant Examiner—Ian J. Lobo
Attorney, Agent, or Firm—Mason, Fenwick & Lawrence

[57]  ABSTRACT

A marine acoustical streamer cable having plural sections connected serially together with the streamer sections having connector couplers at opposite ends thereof adapted to be secured in mated relation without rotation to companion connector couplers of the same construction at the ends of adjacent streamer sections, each coupler comprising an axially elongated coupler body having a fully cylindrical anchoring head portion at one end and an axially elongated half cylindrical segment portion extending integrally from the anchoring head portion. The half cylindrical segment portions of the companion couplers when secured in mating relation collectively form a cylinder of the diameter of the streamer jacket. Insulator core assemblies are removably located in the coupler bodies having multiterminal electrical pin and socket type plug panels mated together and supported in floating relation relative to the coupler body so that deformation of the stress carrying coupler body is not transmitted to its associated electrical plug panel. Locking rings adjacent the ends of the half cylindrical segment portions secure the coupler bodies together with their half cylindrical segment portions mated together.

26 Claims, 12 Drawing Figures

SEISMIC STREAMER CONNECTOR ASSEMBLY

BACKGROUND AND OBJECTS OF THE INVENTION

The present invention relates in general to towed marine acoustical cable systems, such for example as marine seismic streamers of the type having a plurality of serially connected streamer sections each formed of a buoyant fluid filled plastic tube containing stress members, structural spacers, and optionally containing a hydrophone array and/or other seismic prospecting components, adapted to be towed at a pre-determined depth for purposes such as seismic surveying or prospecting or other underwater acoustical detection applications. More particularly, the present invention relates to coupler devices for serially connecting together each of a successive pair of serially arranged acoustical streamer sections to provide reliable couplings having sufficient axial strength to withstand strains imposed by a long acoustical underwater streamer of several thousand feet and providing effective sealing of plug cavities at the connection sites so that the electrical connections are effectively isolated from the surrounding water.

Heretofore, a number of marine seismic detection cables or streamers, the terms being used interchangeably, have been devised for making seismic surveys of terrestrial subsurface structures disposed beneath the surface of seawater. In general, the marine seismic streamers have included a leading cable and a plurality of serially connected active sections formed of a buoyant fluid filled plastic tube surrounding an array of hydrophones, strain cables, structural spacers, transformers, and mechanical and electrical connectors such as, for example, the type disclosed in U.S. Pat. No. 2,465,696 issued Mar. 29, 1949 to Leroy C. Pasley or U.S. Pat. No. 3,371,739 issued Mar. 5, 1968 to Raymond H. Pearson, and U.S. Pat No. 3,812,455 issued Mar. 21, 1974 to Raymond H. Pearson. Inactive streamer sections are also often interspersed in the string of serially connected seismic streamer sections at various locations. Such marine seismic streamers or cables may in many cases result in cables of a mile or more in length, a typical streamer system being about 7,000 feet long, with each streamer section being typically 100 feet or more in length.

During seismic survey or prospecting operations, the streamer is towed at a selected depth below the surface of the sea by a seismic survey vessel and may include any of several conventional devices for maintaining the seismic cable at the desired underwater depth. The cables are sometimes provided with a plurality of weights at spaced intervals to make them negatively buoyant and flotation means or rigid boom means may be associated with the cable to assist in maintaining it at the desired depth. Alternatively, regulation of the buoyancy of the streamer may be achieved by pumping oil or other buoyant fluid into or withdrawing such fluid from the streamer sections to maintain a pre-determined degree of buoyancy, or, as another option, the steamer may be positively buoyant and paravane type structures may be used employing diving planes which are regulated in preselected relation to pressure responsive devices to maintain the streamer at the desired depth.

Because of their operation at various subsurface levels, the streamer sections may occasionally strike ocean bottom reefs, shell-beds or other submerged objects, damaging the connections between successive sections and permitting saltwater contact with electrical conductors in the system resulting in electrical leakage and/or shorting. Similar damage may occur to the plastic sleeve or boot portion of one or more streamer sections, necessitating removal of that section of the streamer to allow replacement or on-deck repair of the damaged section. If the electrical connections are damaged by seawater, they must be removed and cleaned again requiring decoupling of the involved streamer section from the remainder of the streamer and subsequent reconnection of the repaired section with the remaining streamer sections.

Also, the strain cables running through each of the streamer sections must be connected together at the junctures between successive sections in such a way as to provide a strong mechanical connection lending great axial strength to the system, so that streamer sections near the upstream end of the streamer are capable of withstanding the strain imposed by all of the succeeding sections. Also, the configuration of many prior art connections between successive streamer sections have been such as to create turbulence in the surrounding seawater, thus producing a poor signal-to-noise ratio. Furthermore, many of the prior art connections or couplings do not effectively resist relative rotation between adjacent successive streamer sections because the connector components are rotated relative to each other during assembly and are not adequately restrained against rotation during use.

An earlier seismic streamer connector structure effectively eliminating or minimizing many of these problems is disclosed in U.S. Pat. No. 3,812,455 issued to Raymond H. Pearson. However, improvements over that structure have been sought by the assignee of the present application, who is also the assignee of that patent, to provide improved distribution of tensile stresses so that the walls of the stress carrying outer housing portions may be thinner and therefore reduce the weight of the connector joint, and by separating the sealing/electrical connecting parts of the coupling from the stress-carrying parts so that the sealing/electrical connecting portions, in effect, float in the stress-carrying portions to avoid transmittal therebetween of deformations of the stress-carrying portions.

An object of the present invention, therefore, is the provision of a novel connector structure for connecting together successive sections of serially connected marine acoustic steamers, to provide adequate axial strength to withstand the strains imposed by a long series of succeeding cable sections trailing behind the connection, and effectively separating the stress-carrying components to avoid transmittal to the latter of deformations of the stress-carrying parts.

Another object of the present invention is the provision of a novel connector structure for successive sections of marine acoustic streamers formed of a plurality of serially connected sections, wherein the coupling components to be mated together are connected without relative rotation between them so that relative rotation between interconnected mating sections of successive streamer sections is eliminated, and which improves the distribution of tensile stresses so as to permit use of thinner walls of the stress-carrying outer housing portions.

Another object of the present invention is the provision of a novel connector structure for intercoupling the successive sections of a marine acoustic streamer formed of serially connected sections, wherein plug cavities are provided for interconnecting electrical plugs to electrically coupled successive sections together upon mating of complimentary semi-cylindrical coupler components, and wherein highly reliable sealing and electrical connecting components are disposed in floating relation in the stress-carrying components deformations are not transmitted to the sealing and electrical connecting parts.

Yet another object of the present invention is the provision of a novel connector structure for interconnecting successive sections of a marine acoustic streamer as described in the preceeding paragraphs, having a novel construction which greatly facilitates field servicing of the streamer sections by having the electrical terminations on the streamer sections readily accessible, and more particularly by providing for easy access to the wired side of the insulator panels, to facilitate rewiring, troubleshooting, and permit incorporation of spare conductors, and wherein the pins and sockets in the insulator panels are sealed to prevent fluid lost or migration but which can be readily removed, replaced and resealed in the field.

Another object of the present invention is the provision of a novel connector structure for interconnecting successive sections of a marine acoustic streamer, wherein the stress members, for example three wire rope members, are anchored in a swanged terminal retainer at each end of each streamer section wherein the retainer is of insulating material or is coated with insulation to provide electrical isolation of the stress members so that the stress members are electrically "floating" rather than having to be electrically grounded.

Still another object of the present invention is the provision of a novel connector structure for interconnecting successive sections of a marine acoustic streamer, wherein a large number of electrical pin and socket connections are provided for interconnecting various signal wires between the acoustic transducers and the towing vessel, and wherein plug and socket connectors and housing facilities are provided for a program plug to provide for programming or selective interconnecting of various signalling connectors that are not part of the acoustic signalling conductor system and for selectively varying interconnections or groupings as desired between the acoustic signalling conductors without requiring jumper rewiring of wires or conductors in the connectors.

Other objects, advantages and capabilites of the present invention will become apparent from the following detailed description, taken in conjunction with the accompanying drawings illustrating a preferred embodiment of the invention.

DETAILED DESCRIPTION OF A PREFERRED EMBODIMENT

Figure 1:
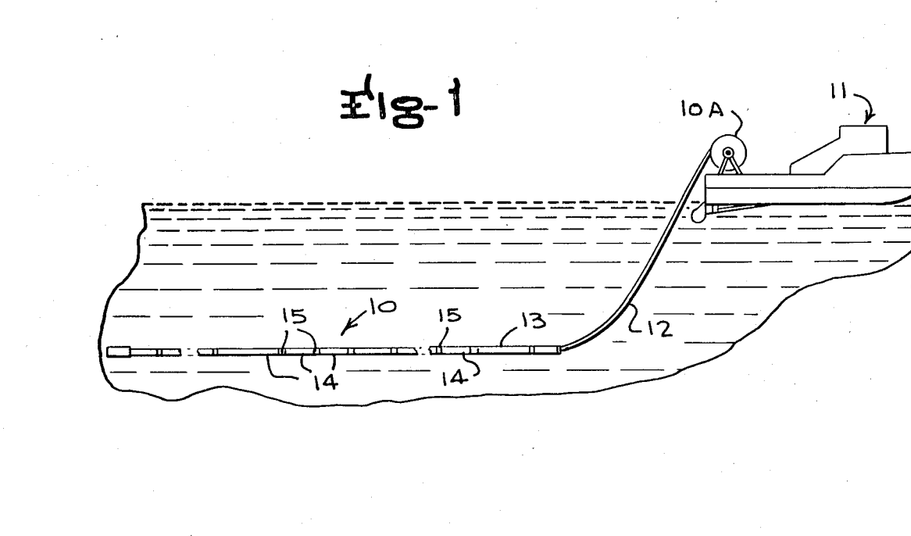
FIG. 1 is a diagrammatic view of a marine seismic streamer embodying the present invention, shown in a towed position of use.

Referring to the drawings, wherein like reference characters designate corresponding parts throughout the several figures, there is illustrated in FIG. 1 in diagrammatic form a seismic detector streamer or cable 10 secured to a drum 10A on a towing vessel, indicated generally by the reference character 11, designed to be towed at various preselected depths through the sea area to be prospected by the streamer 10. The seismic detection streamer 10 includes a lead-in cable 12 which may have fairings and contain signal wires, strain cables, and other connection elements required for operation, followed by, for example, an elastic section 13, and active sections 14. Conventional depth control means are associated with the streamer, which may take the form of paravane depth control devices, to maintain the desired depth of the active streamer sections. Inactive streamer sections 15 may be interspersed in the streamer system as desired, and a conventional trailing device may be employed at the trailing end of the streamer. The general method of operation of such seismic detection streamers in conducting seismic exploration is described in general in the prior Pasley U.S. Pat. No. 2,465,696 and the construction of the streamer sections may be generally of the structural nature illustrated in prior Pearson U.S. Pat. Nos. 3,371,739 or 3,812,455.

The streamer sections 14, which are arranged in serial relation along the streamer cable and are coupled together by the coupling structure which is the subject matter of the present invention, each contain a plurality of hydrophone units spaced in a selected arrangement or array along the streamer section. The outputs of the hydrophone units in a single section are usually connected in parallel groups through many signal wires which must be connected in some manner at the coupling devices between adjoining streamer sections. This has heretofore primarily been accomplished by means of multiterminal male and female plugs.

Figure 2:
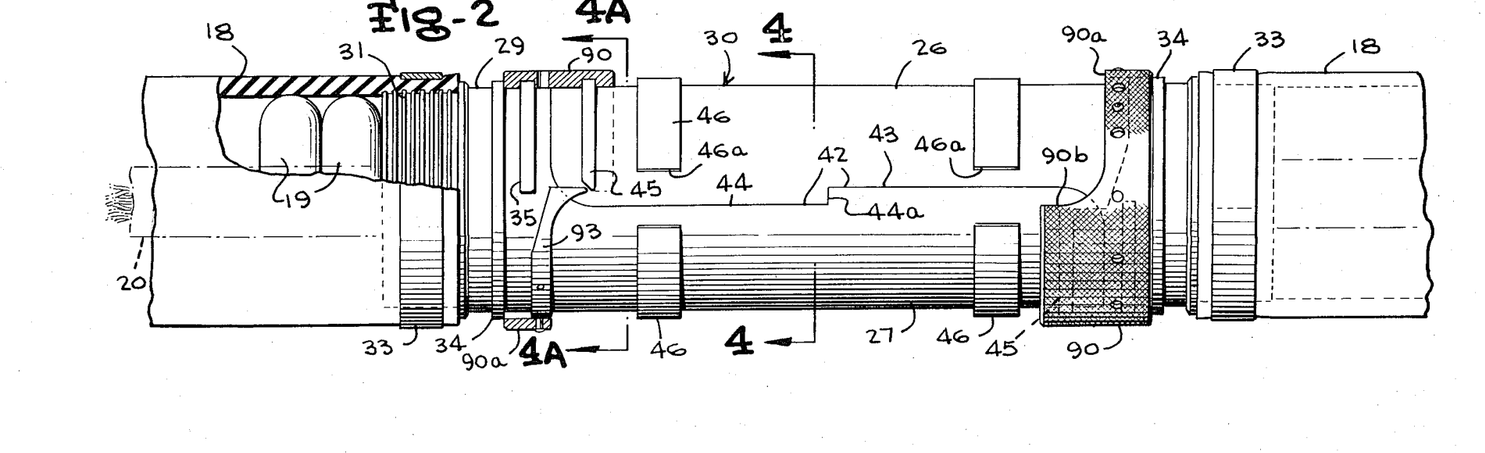
FIG. 2 is a fragmentary side elevation view, to enlarged scale, illustrating the exterior of the mated coupler sections and adjacent end portions of a pair of interconnected seismic streamer sections embodying the present invention, with some parts shown in section.

As shown in FIG. 2 each streamer is typically formed of an outer tubular jacket or hose which is flexibly expandable to some degree, formed for example of polyvinyl material, indicated generally by the reference character 18, surrounding a plurality of spacers 19,
which may be disposed in various arrangements and located between the opposite ends of the streamer sections. The spacers 19 may be arranged, for example, with a pair of such spacers located closely to each other, and then the next pair of spacers located about 3 feet apart along the cable from the first-mentioned pair. The spacers usually made of a rigid plastic material, each spacer being for example, of a slightly distorted, hollow doughnut configuration having a center opening through which a multiple conductor cable extends. The multiple conductor cable, indicated generally by the reference character 20, in the example illustrated, contains a number of insulated signal wires forming the bundle or group of signal cables and outwardly of this cable are disposed three wire rope stress members or strain cables 21. The spacers 19 aid in maintaining the cylindrical shape of the thick wall flexible outer tube or jacket 18 as well as locating the strain cables 21 and signal conductor cable 20 properly located within the jacket 18.

The coupling connector structure of the present invention for removably interconnecting the two adjacent ends of a successive pair of the active streamer sections 14 in the streamer cable 10 comprises a pair of mated connector halves 26 and 27 of nearly identical configuration, except for the types of plugs carried thereby. These mating connector halves 26, 27 each comprises a main connector body 28 which in the perferred embodiment is a machined member, which may be of material such as beryllium copper tubing, each comprising a cylindrical head or end portion 29, forming the anchoring end of the respective mating connector, together with an intregral axially elongated semicylindrical plug housing segment portion 30 which has an axial length several times that of the head or end anchoring portion 29 and, in the illustrated embodiment, has an axial length which is more than twice the diameter of the connector halves 26, 27 when assembled.

The anchoring head or end portion 29, as will be described in greater detail hereinafter, includes a generally corrugated or undulating surface portion 31 (best shown in FIGS. 3 and 5) over a predetermined axial zone extending from the proximal edge of the head or end portion 29 adjacent the streamer jacket 18, which provides a plurality of zero-pitch threads bounded by an annular ring formation 32 defining a stop shoulder 32a (FIG. 5), designed to be inserted into the adjacent end portion of tubular jacket 18 of the associated streamer section 14 and be clamped thereto by a conventional cable clamp, as indicated at 33 to form a secure, liquid tight seal end connection the outer jacket 18 and the anchoring portion 29 of the associated connector half 26 or 27. The remaining portion of cylindrical anchoring head or end portion 29 of each connector half is provided with a full circular stop shoulder ring 34 and a half circular or interrupted locking land or rib 35 to cooperate with a locking ring as hereinafter described.

Figure 5:
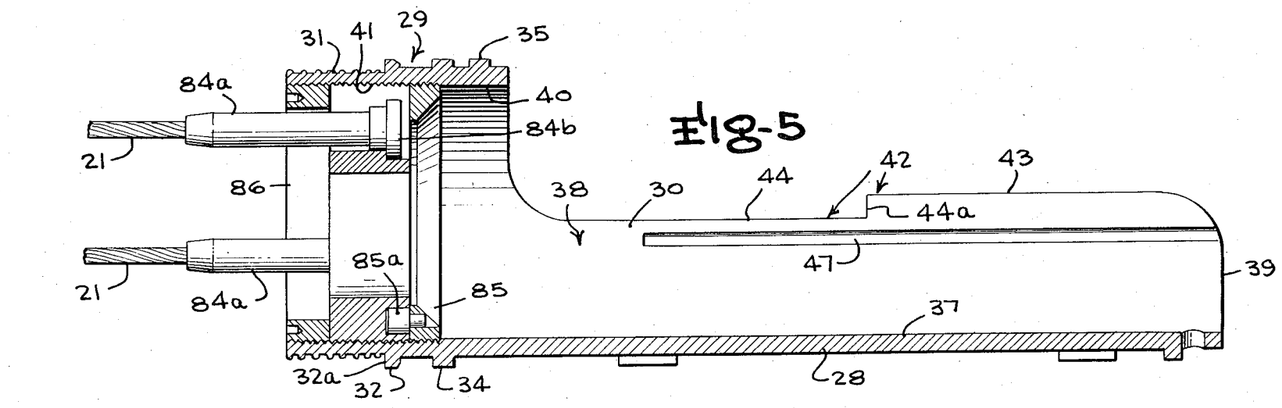
FIG. 5 is a longitudinal vertical section view taken along the line 5—5 of FIG. 4 through one of the connector halves with the insulator housing assembly removed and showing the associated terminal retainer anchor assembly in place.

The remainder of elongated semicylindrical segment portion 30 extending integrally from the head or end portion 29 of each connector half forms a half cylindrical hollow concave shell half, indicated at 37 providing a half cylindrical cavity or bore 38 extending the length thereof which opens through the free end 39 of the semicylindrical segment portion 30 and communicates with a fully cylindrical through-bore 40 FIG. 5 extending through the length of the cylindrical anchoring head or end portion 29 and of the same radius as the half cylinder cavity or bore 38, forming in affect an extension thereof. The fully cylindrical bore 40 is provided with along its interior surface with female threads 41 over a substantial distance from the proximal end of the head portion 29 for receiving strain cable anchoring ring structure as later described, and the confronting or corresponding longitudinally extending laterally bounding edges or boundry lips of the elongated semicylindrical segment portion 30 defining the sides of the half cylindrical cavity 38 are provided with interlocking transverse shoulder formations such as rectangular square-wave-like interfitting tooth and trough edges 42 formed of one or a series of alternating teeth 43 and intervening trough recesses 44 interfitting into correspondingly shaped and sized recesses 44 and teeth 43 of the segment portion 30 of the companion mating connector half in the assembled condition of the connectors to form a pair of transverse shoulder surfaces at the two transitions 44a between the teeth and troughs in the FIGS. 2 and 5 form, or the many like transitions 44a of the multitooth form of FIG. 3, to enable the connector to better carry the longitudinal strains imposed when towing the seismic cable.

The exterior surface of the elongated semicylindrical segment portion 30 of each connector half 26, 27 is also provided with semicylindrical locking land or rib formation 45 FIG. 2 to align with the locking land or rib 35 of the head portion 29 of the companion connector half in mating or assembly position, and also has a pair of radially outwardly projecting, almost half-cylindrical, lug or shoulder-forming rib formations 46 providing shoulders 46a near but spaced slightly from the row of interlocking teeth 43 of the associated connector half to be engaged by jaws of a removing device, such as a toggle press, to pull the two connection halves apart when it is desired to decouple them from each other. The semicylindrical concave interior surface of the cavity 38 is also provided with a pair of elongated channel recesses 47 extending parallel to the center axis of the associated connector half 26, 27 near the opposite toothed edges 42 of the semicylindrical segment portion 30 and located, in the illustrated embodiment of FIG. 5, substantially at the level of the shoulders 46a of the lug or rib formations 46, and opening through the free end 39 of the segment portion 30, to receive removable stabilizer guide keys, later described, for inserting and mounting the plug assemblies.

Insulator core or housing assemblies 50 are provided (shown best in FIGS. 4, 4A and 6) to be received respectively in each of the half cylindrical cavities or wells 38 and the adjoining part of the bore portion 40 of each of the main connector half bodies 28 to support and position plural pin plug and socket panels or connector plates 51, 52 to, in effect, "float" them in the stress-carrying connector half bodies 28 so that deformation of these stress-carrying parts is not transmitted to the sealing and connecting parts formed by the insulator core assemblies and panels or connecting plates 50, 51, 52. As illustrated in the drawings, the insulator core assemblies 50 comprise an insulator core member 53 machined for example from reinforced acetal plastic material, having a cylindrical headwall portion 54 of a diameter closely corresponding to but just smaller than the inner diameter of the bore 40 to interfit therein, provided with transverse encircling grooves 55 to receive a pair of sealing rubber or elastomeric sealing o-rings 56, and having an elongated segmental cylindrical panel or connecting plate supporting portion 57 projecting from the headwall portion 54 corresponding substantially to the axial length of the semicylindrical segment portion 30 of the connector half body 28. The semicylindrical elongated panel or plug supporting portion 57 is hollow over most of its length, providing a cavity 58 which opens through the headwall portion 54 through a shaped entrance throat 58a whose bounderies curve to a progressively enlarging entry end to the throat 58a, and which includes an end wall 60. The cavity or hollow 58 is bounded laterally by opposite side rims 61a, 61b and is bounded transversely adjacent its juncture with the headwall portion 54 by a flange 62 collectively providing a surrounding lip or rim for the cavity 58, which is sealed by a rectangular sealing o-ring 64 fitted in a generally rectangular groove or channel 63 with rounded corners in the bottom of panel 51 or 52.

One of the insulator core members 53, for example the one to be assembled in the cavity 38 and communicating bore 40 of the connector half 26 is adapted to support the multiple socket connector panel or connector plate 52, which is also formed of insulating materials such as reinforced acetal plastic or the like, which as illustrated in the drawings is of rectangular form and is provided with an array of a large number of conductor sockets 66. Near its periphery it contains a spaced series of apertures for receiving sealing screws 67 located at the corners and along its lateral bounderies, tapped into sockets initially of smaller diameter than the screws located in side rims 61a, 61b of the associated insulator core member 53. The bottom or rear face of the female connector panel or plate 52 is drawn tightly down against the o-ring 64 to securely seal the cavity 58 entirely around the perimeter of the female connector panel or plate 52, and the panel or plate 52 also has an encircling groove 68 receiving a quad type sealing ring 69 to seal against a sealing o-ring 69a in a groove 69b in connecting panel or plate 51 in the assembled condition. Additionally, the female connector panel or plate 52 includes a plurality of guide sockets 70, for example located at the corners of the panel, to receive guide pins 71 properly positioned and projecting from the companion male connector panel or plate 51 as illustrated, to facilitate guiding the array of conductor pins 72 of the male connector panel or plate 51 in properly aligned position into the proper conductor sockets 66 of the female connector panel 52.

Figure 4:
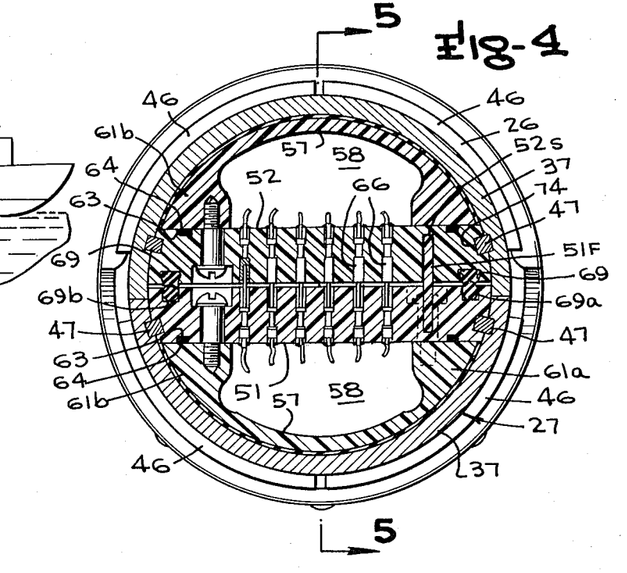
FIGS. 4 and 4A are vertical transverse section views taken along the section plane indicated by the line 4—4 and 4A—4A of FIG. 2.

The multiple pin conductor panel or conductor plate 51 is similar to the female conductor panel or plate 52, in that it is a rectangular panel of reinforced acetal plastic or similar material of like, width, length and thickness dimensions, and is similarly provided with holes for sealing screws 67 located in like manner to those for the female connector panel or plate 52 for securely fixing the male connector panel 51 on the insulator core member 53 of its associated connector half 26. The male connector panel 51 is similarly drawn tightly against the sealing ring 64 of its associated insulator core member 53 to provide a liquid tight seal for the cavity 58 of the associated insulator housing member, and includes the projecting guide pins 71 in proper alignment with the guide sockets 70 of the female connector panel 52 to facilitate proper alignment and guiding of the conductor pins 72 into the conductor sockets 66 upon assembly of the two mateing sections. It would be appreciated that the male connector pins, having a construction as illustrated in FIG. 4, are connected to respective signal wires, as indicated at 73, extending from the various hydrophones or transducers elements forming the hydrophone array in the associated seismic streamer section, and the female conductor sockets 66 are similarly connected to signal wires 73 extending to other hydrophones or signal conductors in their associated seismic streamer section. In a perferred example, the male conductor pins 72 and the female sockets 66 extend through, are have conductor portions extending through, the back face of the respective connector panels 51 and 53 and are sealed by an epoxy layer applied to the back surfaces of the male and female panels to prevent the bouyant fluid in the cavity 58 in the operative condition of the coupler from creaping through the panels 51, 52 at the locations of the conductor pins and conductor sockets. The signal wires are connected, for example by soldering, to the portions of the male connector pins 72 or sockets 66 which project beyond the rear faces of the panels 51, 52 into the cavities 58 of the respective insulator core assemblies 50, and thus may be connected and disconnected from the pins and sockets in various desired patterns.

Figure 3:
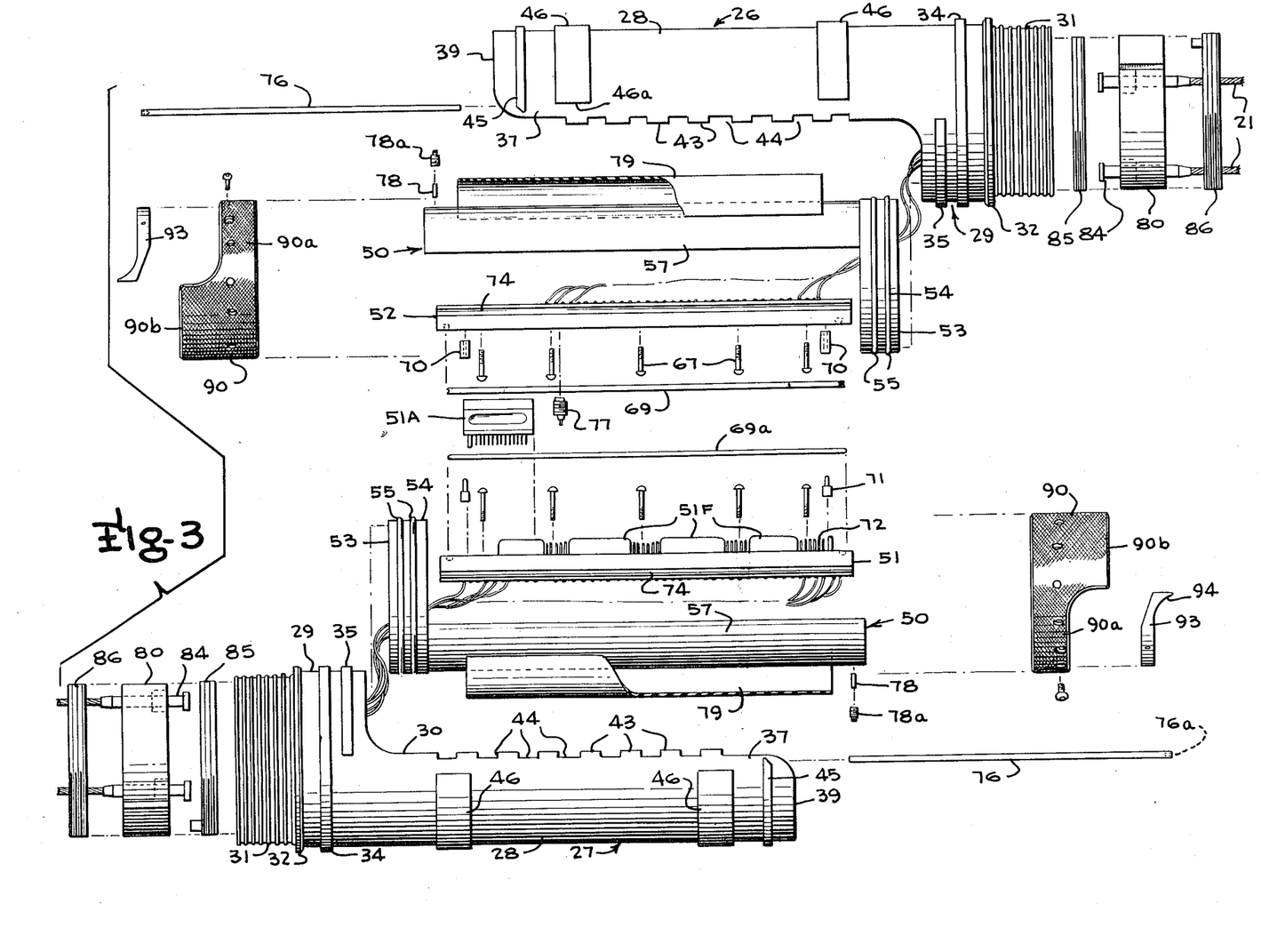
FIG. 3 is an exploded elevational view of the basic components of two companion coupler sections but showing a form having a larger number of interfitting teeth along each coupler.
Figure 6:
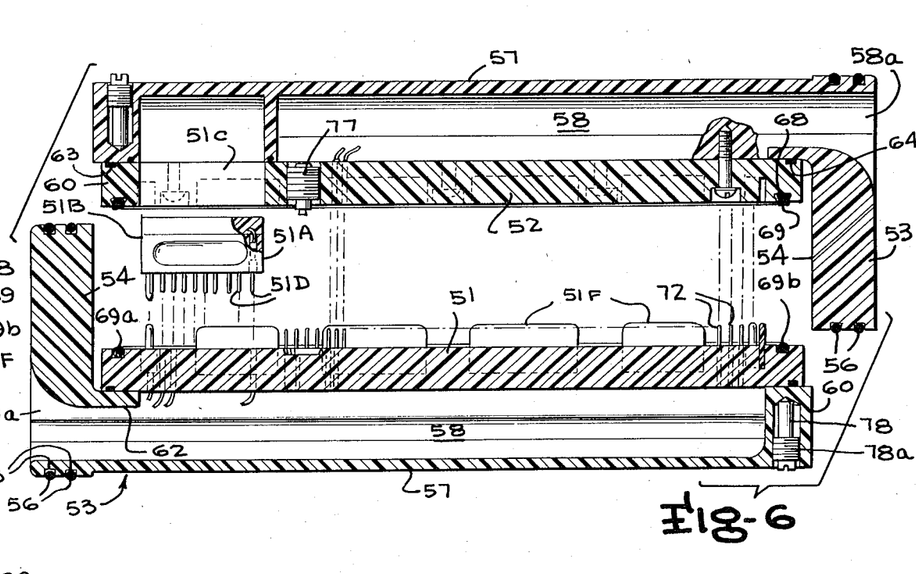
FIG. 6 is an exploded vertical section view of the two companion insulator housing assemblies for one coupler pair.
Figure 7:
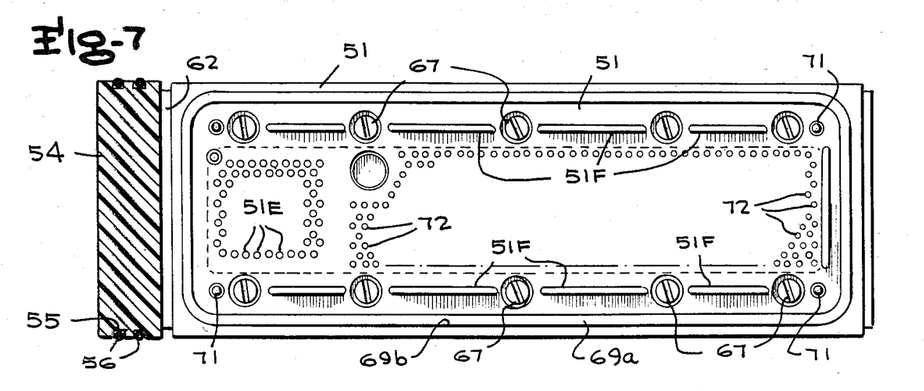
FIG. 7 is a section view of one of the insulator housing assemblies taken along the line 7—7 of FIG. 6.
Figure 8:
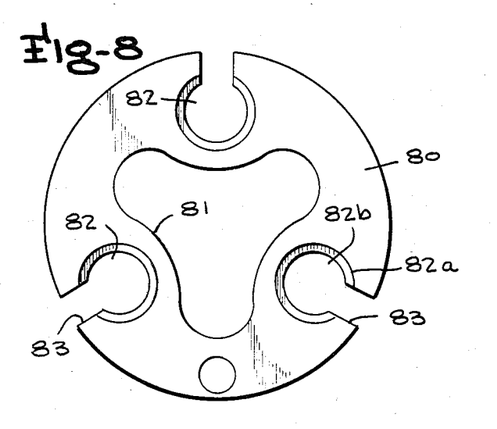
FIG. 8 is an end elevation view of the retainer of anchor member, with the strain wire terminals removed.

Since acoustic streamer sections such as seismic streamers, in addition to containing the hydrophones and the hydrophone signal conductors, may frequently contain auxiliary channels or devices, for example such as pressure transducers, waterbreak detectors, heading sensors, coupling coils to external devices, and other equipment that sends information to or is controlled from the towing vessel, the coupler assembly of the present invention is also provided with what is referred to as a program plug, indicated at 51A in FIGS. 3 and 6, having a substantially rectangular or blockshaped main body portion 51B received in nested relation in a similarly shaped and sized well or cavity 51C formed in the female conductor panel 52 near the end of the panel which lays adjacent the end wall 60 of the associated insulator core assembly 50. The program plug 51A has an array of male connector pins 51D similar to the pins 52 of the connector panel 51, which are designed to be received in female conductor sockets 51E provided on the companion male connector panel 51 and appropriately located to receive the program plug pins 55D therein when the two insulator core assemblies 50 are mated together. The program plug sockets 51E may be wired to auxiliary devices as desired to establish auxiliary device channels between the associated streamer section and the multiple conductor cable 20, and the connections between the program plug pins 51D internally of its main body 51B may be made to establish the desired connections in the system. If different interconnections are desired, different program plugs 51A may be provided for each program or interconnection pattern desired, thus facilitating programming of the streamer for different applications or different auxiliary devices. Also, the program plug sockets 51E can be interconnected with various ones of the signal connector pins 72 and program plugs 51A can be provided to establish various wiring schemes between the connector pins 72 without the necessity of inserting a number of jumpers to make such signal conductor wiring scheme variations as has been the practice heretofore.

It will be noted from the drawings that the male connector panel or plate 51 and the female connector panel or plate 52 in the illustrated embodiment contains rectilinear, laterally outwardly opening channels 74 in their side edges, which are aligned with rectilinear guide grooves 47 in the inwardly facing surfaces of the semicylindrical segment portions 30 of the respective connector halves. These guide grooves 47 receive elongated removable stabilizer guide keys 76 interfitting in the grooves 47 and the guide channels 74 (FIG. 4A) to stablize the insulator housing panels 51, 52 at proper positions in their respective segmental support portions 57. These keys 76 may be withdrawn longitudinally from the grooves 47, 74 by inserting screws or a screw threaded tool end into an internally threaded socket 76a in the end of each key 76 nearest the end wall 60, and when the screws 67 are removed, the associated panel 51 or 52 can then be pulled away from its supporting segment 57 in a direction perpendicular to the coupler axis for servicing or alteration.

Also, the female connector panel or plate 52 is provided with a flooding valve assembly 77 (FIG. 3) which is simply an internally threaded hollow cylindrical sleeve or carrier for a plunger operated valve, such as a Schrader automotive valve, for example the Scoville No. 5137 valve core having a plunger which is contacted and depressed by the confronting surface of the male connector panel 51 when the male and female connector panels become fully assembled, to open communication between the buoyant fluid spaces in the streamers and the space between the two now fully mated connector sections so that there is no pressure differential relative to outside sea pressure.

Each of the insulator core members 53 also have a vibration dampener 78 (FIGS. 3 and 6) located in a cavity in the end wall 60 of each of the associated insulator core members 53 abutted by an insulator locating screw 78a threaded in a socket in end wall 60 and projecting into a hole therefore in the segment portion 30 of body 28, and a thin sheet of resilient material, such as 1/32 inch teflon forms a core assembly cushion 79 interposed between the outer surface of core portions 57 and the confronting surface of segment portions 30 of the connector halves 26, 27.

The male connector panel 51 also includes a plurality of pin guard fins 51F arranged in a pattern laterally flanking the array of male conductor pins 72 arranged in serial fashion along the side edges of the panel 51 and one each being provided also near the opposite ends of the panel 51, which project from the front face of the panel 51 a distance slightly greater than the pins, to serve as barriers intercepting the approach paths laterally toward the pins to shield against accidental bending of the pins. These pin guard fins 51F interfit into elongated recess slots indicated at 52S in FIGS. 4 and 4a.

Figure 4A:
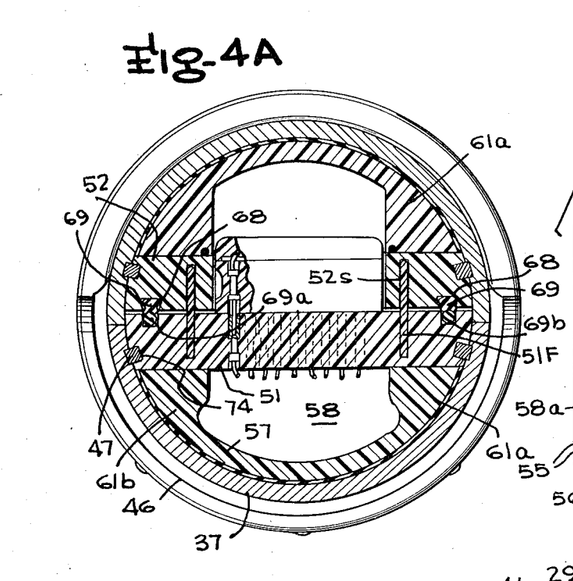

Additionally, as shown best in FIG. 4a, highly reliable face-to-face sealing is achieved between the closely adjacent front faces of the male and female connector panels 51, 52, by providing the sealing o-ring 69 in the encircling groove 68 of the panel 52, and providing a quad type sealing ring 69, for example of the configuration shown in FIG. 4a, seated in the dovetail shaped groove 68 in the connector plate 52 positioned to butt against the o-ring 69a at all points along the path of the o-ring 69a. As shown in FIG. 4a, the quad ring is substantially square in cross section with slightly concave faces, designed to seal closely against the o-ring 69 in its groove 69b. This is to avoid the possible high risk situation which could arise if one merely provided an o-ring on one of the plates to butt against the flat surface of the other insulator plate, because a small scratch or imperfection in the flat surface of the companion plate against which the o-ring was to seat could spoil the seal. Repair in such a situation would require replacing the whole insulator plate which would also involve rewiring the entire coupling. By providing the quad ring 69 in one insulator plate 51, or 52, to seal against the o-ring 69 in the other insulator plate, both sealing surfaces are replaceable and all rigid machined surfaces that are important to the seal are well protected.

The respective head end portion 29 of connector halves 26, 27 are suitably, firmly anchored to the strain cables 21 of their respective seismic streamer sections, usually three of such strain cables 21 being normally provided. In the illustrated embodiment, this strain cable anchoring is achieved by a terminal retainer swage or anchoring member 80 (FIGS. 3 and 6) a three lobe shaped center cavity 81 and three terminal anchoring wells 82 each having an enlarged head receiving portion 82a and a smaller diameter constricted portion 82b, each of which communicates with an entrance slot 83 opening radially outwardly from the terminal anchoring wells 82 through the cylindrical periphery of the terminal retainer swage or anchor 80. The anchoring wells 82 are shaped to receive terminal members 84 having an elongated body portion 84a to be securely fixed to the end of a respective strain wire 21 and having an enlarged diameter head 84b properly sized to fit into and be securely held by the enlarged diameter well portion 82a of the terminal anchoring wells 82. The end face of the terminal retainer swage or anchor member 80 through which the head receiving cavity or well portions 82a open is positioned against an externally threaded retainer nut 85 which is threaded into the threaded bore 40 of the head portion 29 of the associated connector half 26, 27 in advance of insertion of the terminal retainer swage or anchor member 80 with the strain cable terminals 84 assembled therein, and a second annular retainer nut 86 having external threads sized to be threadedly coupled in the threaded head end portion 40 intercoupled with the threads 41 therein is then assembled in the threaded bore 40, for example by a suitable wrench having drive pins removably inserted into pin receiving sockets in the retainer nut 86 to securely fix the retainer swage or anchor member 80 between the nuts 85 and 86 with the strain cables extending through the center opening 86a of the retainer nut 86. An antirotation pin 85a lying in holes in both the nut 85 and anchor 80 resists rotation of the anchor 80.

Figure 9:
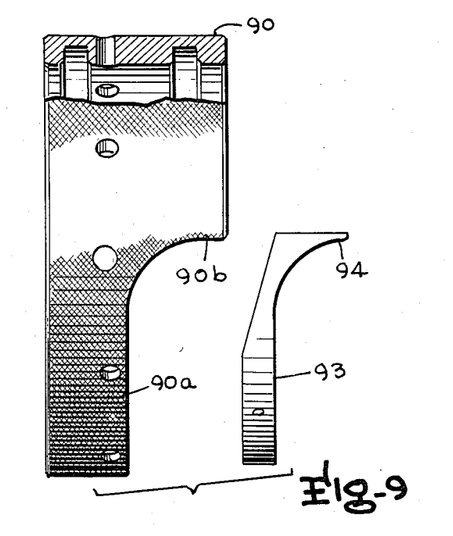
FIG. 9 is an exploded elevation view of the locking ring assembly.
Figure 10:
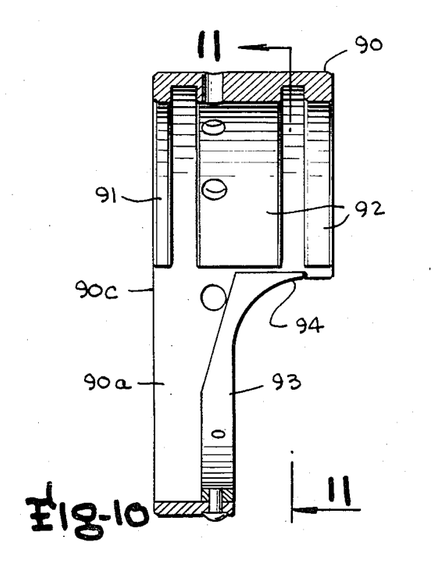
FIG. 10 is a vertical longitudinal section view through the locking ring assembly.
Figure 11:
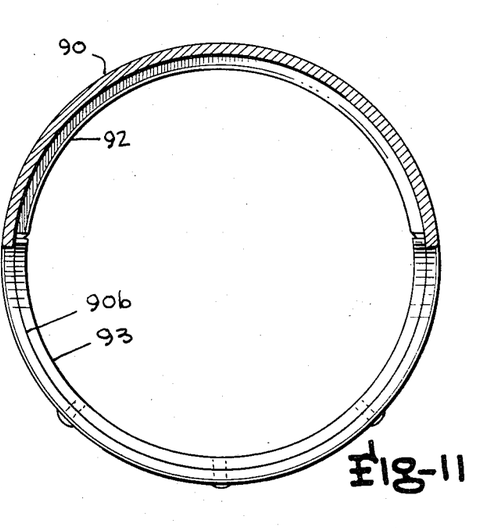
FIG. 11 is a vertical transverse section view taken along the line 11—11 of FIG. 10.

The two mating connector halves 26, 27 are assembled together with their interfitting teeth 43 positioned close together in interfitting relation as illustrated in FIG. 2, and with the male conductor pins 72 received in the appropriately aligned conductor sockets 66, alinement of which may be assisted by a mechanical toggle assembly and dissembly jig and toggle press, and are interlocked in the mated, assembled position by locking rings 90, best illustrated in FIGS. 9 and 11. As shown in those Figures, the locking rings 90 include a full cylindrical surround portion 90a integral with a half cylindrical portion 90b encircling the head end portion 29 of the associated connector half 26, 27. The full cylindrical portion 90a has a half cylindrical lip or rib 91 immediately adjacent the end 90c of the locking ring to be received between the full locking land or rib 34 and the interrupted locking land or rib 35, and the half cylindrical portion 90b of the locking ring has a pair of axially spaced half cylindrical ribs 92 to receive the locking land or rib 45 therebetween. In the zone of the locking ring between the half cylindrical locking rings 35 and 45 in the assembled condition, is a spring latch semicylindrical member 93 of spring-like material providing a resiliently moveable latching foot formation 94 adapted to project into tight frictional contact with the inclined end surface portion of the locking land or rib 35.

The purpose of the locking rings 90, which resemble locking nuts with threads that have no lead or pitch, is to improve the distribution of tensile stresses by carrying a large part of the load that would otherwise have to be carried by the interfitting teeth 43, thus allowing the walls of the stress carrying outer housing portions 26, 27 to be thinner and thereby reduce the weight of the coupling. It would be appreciated that when the connector pins and sockets of the plural pin connector panels 51 have been assembled together and the shoulder formation 42 of the connector halves 26, 27 are tightly internested, while the locking rings 90 were in the unlocking or release position, the locking rings 90 can then be rotated through 180° in the proper direction to spring the locking foot formation 94 back to a retracted position by engagement with the full width portion of the half cylindrical locking land or rib 45 until the locking rings assume the proper locking position, where upon the locking foot formation 94 springs outwardly to abut the inclined ramp portions of the locking land 45. To disassemble the connector halves, the locking rings 90 are rotated in the proper direction through 180° to bring the semicylindrical half 90b of each ring to a position where it is displaced from the opposing connector half semicylindrical plug housing portion 30, and the shoulders 46a of the lug formations 46 are then engaged by a toggle press or other tool to separate the sections 26, 27 and pull the connector plugs out of the sockets and disconnect the connector panels 51 from each other, for repair, replacement, or any other desired purpose.

What is claimed is:

1. A marine acoustical streamer section for an elongated acoustical streamer cable made up of plural sections connected serially together, the streamer section comprising an elongated streamer jacket of generally cylindrical tubular configuration of predetermined diameter including a bundle of signal wires and plurals strain wires extending through the interior thereof and connector couplers at opposite ends thereof adapted to be secured in mated relation without rotation to companion connector couplers of the same construction at the ends of adjacent streamer sections, each coupler comprising an axially elongated coupler body having a fully cylindrical anchoring head portion at an end thereof and an axially elongated half cylindrical segment portion extending integrally from said anchoring head portion having a distal end spaced from the latter, the half cylindrical segment portions of the companion couplers when secured in mating relation collectively forming a cylinder coaxial with said streamer jacket of a diameter substantially corresponding to the streamer jacket diameter, the coupler body defining a partially segmented tubular shell having a concave cavity extending through the length of said segment portion, said anchoring head portion including strain cable anchoring means and means for passing the bundle of signal wires therethrough, the insulator core assemblies removably received in said concave cavities having multiterminal electrical pin and socket type plug panels supported in the concave cavity of the associated coupler body to be disposed in confronting immediately adjacent parallelism with and connected to a mating multiterminal electrical plug panel of a companion coupler to be mated therewith, the insulator core assemblies for each coupler body having resilient means interposed between the core assembly and the surrounding coupler body and between its associated electrical plug panel and the panel-supporting portions of the associated core assembly disposing them in floating relation relative to the coupler body so that deformation of the stress carrying coupler body is not transmitted to its associated electrical plug panel, and assembly means adjacent to the ends of the half cylindrical segment portions of the coupler bodies remote from their anchoring head portions for securing the coupler bodies together with their half cylindrical segment portions mated together, said assembly means comprising a locking ring rotatably supported on the anchoring head portion of its associated coupler body for rotary movement about the axis of the coupler body between angularly spaced locking and unlocking positions and having an interlock portion disposed to overlap and interlock with the distal end portion of the elongated half cylindrical segment portion of the companion coupler when those coupler bodies are mated together and the locking ring is in the locking position.

2. A marine acoustical streamer section as defined in claim 1, wherein said elongated half cylindrical segment portions of said coupler bodies have a wave edge configuration along each lateral edge thereof extending over most of the axial length of said segment portion defining at least one transverse interlocking shoulder along each edge disposed transversely to the axis of said cylinder to interengage in interfitting relation with the wave edge configuration of the corresponding edges of the half cylindrical segment portion of its companion coupler body when assembled in the mated relation therewith.

3. A marine acoustical streamer section as defined in claim 1, wherein said elongated half cylindrical segment portions of said coupler bodies have a row of plural teeth along each lateral edge thereof extending over most of the axial length of said segment portion defining at least one transverse interlocking shoulder along each edge disposed transversely to the axis of said cylinder to interengage in interfitting teeth of the corresponding edges of the half cylindrical segment portion of its companion coupler body when assembled in the mated relation therewith.

4. A marine acoustical streamer section as defined in claim 1, wherein said anchoring head portion has a cylindrical bore therethrough axially aligned and communicating with said concave cavity therein and said insulator core member in each coupler comprises a cylindrical portion interfitted in said bore and an elongated generally segmental cylindrical extension projecting therefrom within and substantially extending the length of said concave cavity for supporting its associated multiterminal electrical plug panel, said plug panel being of rectangular configuration having multiple pin and socket type connectors and said resilient stress absorbing means comprising resiliently deformable rings separating and sealing said insulator core member from the coupler body and said multiterminal plug panel from its associated supporting extension.

5. A marine seismic streamer section as defined in claim 2, wherein said insulator core member in each coupler device comprises a cylindrical portion interfitted in the anchoring head portion of the connector body and an elongated generally segmental cylindrical extension projecting therefrom within and substantially extending the length of said concave cavity for supporting its associated multiterminal electrical plug panel, said plug panel being of rectangular configuration having multiple pin and socket type connectors and said resilient stress absorbing means comprising resiliently deformable rings separating and sealing said insulator core member from the coupler body and said multiterminal plug panel from its associated supporting extension.

6. A marine seismic streamer section as defined in claim 3 wherein said insulator core member in each coupler device comprises a cylindrical portion interfitted in the anchoring head portion of the connector body and an elongated generally segmental cylindrical extension projecting therefrom within and substantially extending the length of said concave cavity for supporting its associated multiterminal electrical plug panel, said plug panel being of rectangular configuration having multiple pin and socket type connectors and said resilient stress absorbing means comprising resiliently deformable rings separating and sealing said insulator core member from the coupler body and said multiterminal plug panel from its associated supporting extension.

7. A marine seismic streamer section as defined in claim 1, wherein a locking ring rotatably supported on the anchoring head portion of its associated coupler body for rotary movement about the axis of the coupler body between angularly spaced locking and unlocking positions and having an interlock portion disposed to overlap and interlock with the distal end portion of the elongated half cylindrical segment portion of the companion coupler body when those coupler bodies are mated together and the locking ring is in the each coupler body has shoulder formations on the exterior of said anchoring head portion and on the distal end portion of the associated half cylindrical segment portion which underlap the interlock portion of the locking ring of the companion coupler device when in mated position whereby the shoulder formations on the anchoring head portion of one coupler body and on the underlapping portion of its companion coupler body are held against axial displacement by said locking ring.

8. A marine seismic streamer section as defined in either claim 2, 3, 4, 5 or 6 wherein a locking ring rotatably supported on the anchoring head portion of its associated coupler body for rotary movement about the axis of the coupler body between angularly spaced locking and unlocking positions and having an interlock portion disposed to overlap and interlock with the distal end portion of the elongated half cylindrical segment portion of the companion coupler body when those coupler bodies are mated together and the locking ring is in the each coupler body has shoulder formations on the exterior of said anchoring head portion and on the distal end portion of the associated half cylindrical segment portion which underlap the interlock portion of the locking ring of the companion coupler device when in mated position whereby the shoulder formations on the anchoring head portion of one coupler body and on the underlapping portion of its companion coupler body are held against axial displacement by said locking ring.

9. A marine seismic streamer section as defined in either of claim 1, 2, 3, 4, 5, or 7, wherein said shoulder formations are rib-like lands projecting radially outwardly from the exterior surfaces of said coupler bodies and extending circumferentially in parallel planes perpendicular to the center axis of the coupler body through predetermined angles, and said locking rings having a full cylindrical portion and a part cylindrical portion extending therefrom each having inwardly opening grooves forming said shoulder formations to receive said lands therein in said locking position and interlock with the underlapping end portion of the companion coupler body.

10. A marine seismic streamer section as defined in either of claim 1, 2, 3, 4, 5, 6 or 7, wherein said shoulder formations are rib-like lands projecting radially outwardly from the exterior surfaces of said coupler bodies and extending circumferentially in parallel planes perpendicular to the center axis of the coupler body through substantially half circles, and said locking rings having a full cylindrical portion and a half cylindrical portion extending therefrom each having inwardly opening grooves forming said shoulder formations to receive said lands therein in said locking position and interlock with the underlapping end portion of the companion coupler body.

11. A marine seismic streamer section as defined in either of claim 1, 2, 3, 4, 5, 6, or 7, wherein said shoulder formations are rib-like lands projecting radially outwardly from the exterior surfaces of said coupler bodies and extending circumferentially in parallel planes perpendicular to the center axis of the coupler body through predetermined angles, said locking rings having a full cylindrical portion and a part cylindrical portion extending therefrom each having inwardly opening grooves forming said shoulder formations to receive said lands therein in said locking position and interlock with the underlapping end portion of the companion coupler body, and said locking rings including spring latching foot formations positioned to engage end portions of lands of the companion coupler body and restrain the locking ring against rotation from locking position and displaceable to a release position by shaped surfaces on the lands upon predetermined rotation of the locking ring.

12. A marine seismic streamer section as defined in either of claim 1, 2, 3, 4, 5, 6, or 7 wherein said shoulder formations are rib-like lands projecting radially outwardly from the exterior surfaces of said coupler bodies and extending circumferentially in parallel planes perpendicular to the center axis of the coupler body through substantially half circles, said locking rings having a full cylindrical portion and a half cylindrical portion extending therefrom each having inwardly opening grooves forming said shoulder formations to receive said lands therein in said locking position and interlock with the underlapping end portion of the companion coupler body, and said locking rings including spring latching foot formations positioned to engage end portions of lands of the companion coupler body and restrain the locking ring against rotation from locking position and displace to a release position by shaped surfaces on the lands upon predetermined rotation of the locking ring.

13. A marine seismic streamer section as defined in either of claims 1 or 2 or 4 or 6 or 7 wherein said anchoring head portion has a cylindrical bore therethrough having internal threads, and said cable anchoring means comprises an externally threaded shoulder ring and a threaded annular clamping ring and a cable terminal anchoring cylinder therebetween secured in said head portion by threading said shoulder ring and clamping ring therein, said anchoring cylinder having shouldered sockets for terminal members on the strain cables and a passage for the signal wires to pass therethrough for connection to said plug panels.

14. A marine acoustical streamer section as defined in either of claims 1, 2, 3, 4 or 7, wherein the electrical plug panel of the connector coupler at one end of the streamer section includes a plurality of program plug pin and socket type connectors for electrical connection to conductors for auxiliary device circuits in the streamer section in addition to said multiple pin and socket type connectors of said plug panel, and a program plug in the form of an internally pre-wired unitary plug body having an array of electrical connectors to interfit in mating relation with said program plug pin and socket type connectors of said plug panel and electrically interconnected the later in various predetermined programs.

15. A marine acoustical streamer section as defined in either of claims 1, 2, 3, 4, or 7, wherein the electrical plug panel of the connector coupler at one end of the streamer section includes a plurality of program plug pin and socket type connector device circuits in the streamers section in addition to said program plug in the form of an internally pre-wired unitary plug body having an array of electrical connectors to interfit in mating relation with said program plug pin and socket type connectors of said plug panel and electrically interconnected the later in various predetermined programs, and the plug panel of the companion coupler to be mated with said first-mentioned plug panel having a shaped cavity therein to receive said plug body nested therein when the companion couplers are mated together.

16. A marine acoustical streamer section for an elongated acoustic streamer cable made up of plural sections connected serially together, the streamer section comprising an elongated streamer jacket of generally cylindrical tubular configuration of predetermined diameter including a bundle of signal wires and plurals strain wires extending through the interior thereof and connector couplers at opposite ends thereof adapted to be secured in mated relation without rotation to companion couplers of the same construction at the ends of adjacent streamer sections, each coupler comprising an axially elongated coupler body having a fully cylindrical anchoring head portion at an end thereof and an axially elonged half cylindrical segment portion extending integrally from said anchoring head portion having a distal end spaced from the head portion, the half cylindrical segment portions of the companion couplers when secured in mating relation collectively forming a cylinder coaxial with said streamer jacket of a diameter substantially corresponding to the streamer jacket diameter, the coupler body defining a partially segmented tubular shell having a through bore which is fully cylindrical in said cylindrical anchoring head portion and which extends as a half cylindrical cavity through the length of said half cylindrical segment portion, said anchoring head portion including strain cable anchoring means secured therein having strain wire terminal anchoring formations and means for passing the bundle of signal wires therethrough, insulator core assemblies removably received in the half cylindrical cavities of the coupler bodies haying multiterminal electrical plug panels supported in the half cylindrical cavity of the associated coupler body to be disposed in electrically interconnected confronting immediately adjacent parallelism with a mating multiterminal electrical plug panel of a companion coupler to be mated therewith, a locking ring rotatably supported on the anchoring head portion of each coupler body for rotary movement about the axis of the coupler body between angularly spaced locking and unlocking positions and having an interlocking portion disposed to overlap and interlock with the distal end portion of the elongated half cylindrical segment portion of the companion coupler body when the coupler bodies are mated together and the locking ring is in the locking position.

17. A marine acoustic streamer section as defined in claim 16, wherein the interlocking portion of each locking ring comprises an annular portion and an arcuate extension and each coupler body includes rib-like land formations on the exterior of said anchoring head portion and on the distal end portion of the associated half cylindrical segment portions which underlap the annular portion and arcuate extension respectively of the locking ring when in mated position whereby the land formations on the anchoring head portion of one coupler body and on the underlapping portions of its companion coupler body are received in interlocking relation in said locking ring when the latter is in said locking position to hold the interfitted mating couplers bodies against longitudinal axial relative movement.

18. A marine acoustic streamer section as defined in claim 16, wherein said elongated half cylindrical segment portions of said coupler bodies have a wave edge configuration along each lateral edge thereof extending over most of the axial length of said segment portion defining at least one transverse interlocking shoulder along each edge disposed transversely to the axis of said cylinder to interengage in interfitting relation with the wave edge configuration of the corresponding edges of the half cylindrical segment portion of its companion coupler body when assembled in the mated relation therewith.

19. A marine acoustic streamer section as defined in claim 17, wherein said elongated half cylindrical segment portions of said coupler bodies have a wave edge configuration along each lateral edge thereof extending over most of the axial length of said segment portion defining at least one transverse interlocking shoulder along each edge disposed transversely to the axis of said cylinder to interengage in interfitting relation with the wave edge configuration of the corresponding edges of the half cylindrical segment portion of its companion coupler body when assembled in the mated relation therewith.

20. A marine acoustic streamer section as defined in claim 16, wherein said elongated half cylindrical segment portions of said coupler bodies have a row of plural teeth along each lateral edge thereof extending over most of the axis length of said segment portion defining at least one transverse interlocking shoulder along each edge disposed transversely to the axis of said cylinder to interengage in interfitting teeth of the corresponding edges of the half cylindrical segment portion of its companion coupler body when assembled in the mated relation therewith.

21. A marine acoustic streamer section as defined in either of claim 1, 2, 3, 4, 5, or 6, wherein said head portion and distal end portion of said coupler bodies include rib-like lands projecting radially outwardly from the exterior surfaces of said coupler bodies and extending circumferentially in parallel planes prependicular to the center axis of the coupler body through predetermined angles, and said locking rings having a full cylindrical portion and a part cylindrical portion extending therefrom each having inwardly opening grooves forming said shoulder formations to receive said lands therein in said locking position and interlock with the underlapping end portion of the companion coupler body.

22. A marine acoustic streamer section as defined in either of claim 16, 18 or 19, wherein said head portion and distal end portion of said coupler bodies include rib-like lands projecting radially outwardly from the exterior surfaces of said coupler bodies and extending circumferentially in parallel planes perpendicular to the center axis of the coupler body through substantially half circles, and said locking rings having a full cylindrical portion and a half cylindrical portion extending therefrom each having inwardly opening grooves forming said shoulder formations to receive said lands therein in said locking position and interlock with the underlapping end portion of the companion coupler body.

23. A marine acoustic streamer section as defined in either of claim 16, 18 or 19, wherein said head portion and distal end portion of said coupler bodies include rib-like lands projecting radially outwardly from the exterior surfaces of said coupler bodies and extending circumferentially in parallel planes perpendicular to the center axis of the coupler body through predetermined angles, said locking rings having a full cylindrical portion and a part cylindrical portion extending therefrom each having inwardly opening grooves forming said shoulder formations to receive said lands therein in said locking position and interlock with the underlapping end portion of the companion coupler body, and said locking rings including spring latching foot formations positioned to engage end portions of lands of the companion coupler body and restrain the locking ring against rotation from locking position and displaceable to a release position by shaped surfaces on the lands upon predetermined rotation of the locking ring.

24. A marine acoustic streamer section as defined in claim 16, wherein said head portion and distal end portion of said coupler bodies include rib-like lands projecting radially outwardly from the exterior surfaces of said coupler bodies and extending circumferentially in parallel planes perpendicular to the center axis of the coupler body through substantially half circles, said locking rings having a full cylindrical portion and a half cylindrical portion extending therefrom each having inwardly opening grooves forming said shoulder formations to receive said lands therein in said locking position and interlock with the underlapping end portion of the companion coupler body, and said locking rings including spring latching foot formations positioned to engage end portions of lands of the companion coupler body and restrain the locking ring against rotation from locking position and displaceable to a release position by shaped surfaces on the lands upon predetermined rotation of the locking ring.

25. A marine acoustic streamer section as defined in claim 18, wherein said head portion and distal end portion of said coupler bodies include rib-like lands projecting radially outwardly from the exterior surfaces of said coupler bodies and extending circumferentially in parallel planes perpendicular to the center axis of the coupler body through substantially half circles, said locking rings having a full cylindrical portion and a half cylindrical portion extending therefrom each having inwardly opening grooves forming said shoulder formations to receive said lands therein in said locking position and interlock with the underlapping end portion of the companion coupler body, and said locking rings including spring latching foot formations positioned to engage end portions of lands of the companion coupler body and restrain the locking ring against rotation from locking position and displaceable to a release position by shaped surfaces on the lands upon predetermined rotation of the locking ring.

26. A marine acoustic streamer as defined in either of claims 16 or 18 or 19 or 24 or 25, wherein said multiterminal plug panels are each of rectangular configuration having parallel sides to interfit in nested relation in the half cylindrical cavity of the segment portion of its associated coupler body tubular shell with said sides abutting confronting inwardly facing surface portions of said shell adjacent the lateral edges of said elongated half cylindrical segment portions, said sides and said confronting surface portions having registering grooves therein adjacent said lateral edges extending substantially the length thereof parallel to the axis of the coupler body and opening through said distal end, and an elongated stabilizing key removably interfitted in each registering pair of said grooves for restraining the plugs panels against movement perpendicularly away from its associated coupler body shell and to release said plug panel for such movement when the keys are removed axially from said grooves.

* * * * *